United States Patent [19]
Gephardt et al.

[11] Patent Number: 5,655,142
[45] Date of Patent: Aug. 5, 1997

[54] HIGH PERFORMANCE DERIVED LOCAL BUS AND COMPUTER SYSTEM EMPLOYING THE SAME

[75] Inventors: Douglas D. Gephardt; Dan S. Mudgett, both of Austin, Tex.

[73] Assignee: Advanced Micro Devices, Inc., Sunnyvale, Calif.

[21] Appl. No.: 705,884

[22] Filed: Aug. 28, 1996

Related U.S. Application Data

[63] Continuation of Ser. No. 166,067, Dec. 10, 1993, abandoned.

[51] Int. Cl.⁶ .................................................. G06F 13/24
[52] U.S. Cl. .................... 395/800.32; 395/500; 395/650; 395/735; 364/DIG. 1
[58] Field of Search .................................. 395/800, 882, 395/884, 828, 500, 250, 650, 735; 364/DIG. 1

[56] References Cited

U.S. PATENT DOCUMENTS

| | | | |
|---|---|---|---|
| 4,087,855 | 5/1978 | Bennett et al. | 395/425 |
| 4,698,753 | 10/1987 | Hubbins et al. | 395/325 |
| 5,005,121 | 4/1991 | Nakada et al. | 395/800 |
| 5,125,084 | 6/1992 | Begun et al. | 395/375 |
| 5,163,150 | 11/1992 | Matsushima et al. | 395/725 |
| 5,253,353 | 10/1993 | Mogul | 395/425 |
| 5,392,407 | 2/1995 | Heil et al. | 395/325 |
| 5,396,602 | 3/1995 | Amini et al. | 395/325 |
| 5,426,739 | 6/1995 | Lin et al. | 395/325 |

*Primary Examiner*—Larry D. Donaghue
*Assistant Examiner*—Dzung C. Nguyen
*Attorney, Agent, or Firm*—Conley, Rose & Tayon, P.C.; B. Noel Kivlin

[57] ABSTRACT

An integrated processor is provided that includes a CPU core, a local bus coupled to the CPU core, and a variety of peripheral such as a memory controller, a direct memory access controller, and an interrupt controller coupled to the local bus. A bus interface unit is further provided to interface between the CPU local bus and a PCI standard multiplexed peripheral bus. The CPU core, the memory controller, the direct memory access controller, the interrupt controller, and the bus interface unit are all incorporated on a common integrated circuit chip. A local bus control unit is further provided that is capable of generating a loading signal and an address strobe signal synchronously with certain bus cycles that are executed on the PCI bus. The local bus control unit allows external peripheral devices that are compatible with the CPU local bus protocols to be connected through the PCI bus. A latch is coupled to the multiplexed address/data (A/D) lines of the PCI bus and includes a set of output lines coupled to the address input lines of the externally connected peripheral device. The external latch is latched by the loading signal. The cycle definition signals of the PCI bus are further latched within the external latch to provide memory/IO and read/write signals to the external peripheral device. The data lines of the peripheral device may be connected directly to the multiplexed address/data lines of the PCI bus.

18 Claims, 4 Drawing Sheets

HIGH PERFORMANCE DERIVED LOCAL BUS AND COMPUTER SYSTEM EMPLOYING THE SAME

This application is a continuation of application Ser. No. 08/166,067, filed Dec. 10, 1993, now abandoned.

BACKGROUND OF THE INVENTION

1. Field of the Invention

This invention relates to integrated microprocessor systems and more particularly to the derivation of a local CPU style bus from a multiplexed peripheral bus.

2. Description of the Relevant Art

FIG. 1 is a block diagram of a computer system 10 including a microprocessor (CPU) 12, a CPU local bus 14 coupled to microprocessor 12, and a video controller 16 coupled to the CPU local bus 14. A bus interface unit 20 is further shown that provides an interface between the CPU local bus 14 and a multiplexed peripheral bus 22. A peripheral device 24 is coupled to the multiplexed peripheral bus 22, and in addition, a variety of other peripheral devices 26 may further be coupled to CPU local bus 14.

Microprocessor 12 is illustrative of, for example, a model 80486 microprocessor, and CPU local bus 14 is exemplary of an 80486 local bus. The CPU local bus 14 includes a set of data lines D[31:0], a set of address lines A[31:0], and a set of control lines. Details regarding the various bus cycles and protocols of the 80486 CPU local bus 14 are described in a host of publications of the known prior art.

Video controller 16 is provided with computer system 10 for controlling the display of various information on a monitor (not shown). A variety of specific video controllers exemplary of video controller 16 are currently available that connect to an 80486 local bus.

A variety of additional peripheral devices 26 may further be connected to CPU local bus 14. For example, a system memory controller as well as a direct memory access controller may be coupled to local bus 14.

Bus interface 20 provides a standard interface between the CPU local bus 14 and the multiplexed peripheral bus 22. As such, bus interface 20 orchestrates the transfer of data, address, and control signals between the various buses.

Multiplexed peripheral bus 22 is illustrative of, for example, a PCI standard configuration bus. Details regarding the PCI standard bus are provided within the publication entitled "PCI Local Bus Specification"; PCI Special Interest Group; Hillsboro, Oreg.

The microprocessor 12, the video controller 16, the bus interface unit 20, and the other peripheral devices 26 have traditionally been fabricated on separate integrated circuit chips. A new trend in computing systems has developed, however, that involves the incorporation of a CPU core along with a variety of peripherals fabricated on a single integrated microprocessing chip. Such an integrated microprocessing chip typically includes a microprocessor core, a CPU local bus, a bus interface unit, and a variety of peripheral devices such as, for example, a memory controller, a direct memory access controller, and an interrupt controller. Within such an integrated microprocessing system, a set of external pins that provides external access to the CPU local bus may be provided in addition to another set of external pins coupled to the internal bus interface unit that allows the connection of external devices to a multiplexed peripheral bus. However, the incorporation of one set of external pins for the CPU local bus 14 as well as another set of pins for the multiplexed peripheral bus results in a relatively high overall cost due to the large pin count of the integrated circuit chip.

SUMMARY OF THE INVENTION

The problems outlined above are in large part solved by a computer system that derives a local CPU style bus from a multiplexed peripheral bus in accordance with the present invention. In one embodiment, an integrated processor is provided that includes a CPU core, a local bus coupled to the CPU core, and a variety of peripheral such as a memory controller, a direct memory access controller, and an interrupt controller coupled to the local bus. A bus interface unit is further provided to interface between the CPU local bus and a PCI standard multiplexed peripheral bus. The CPU core, the memory controller, the direct memory access controller, the interrupt controller, and the bus interface unit are all incorporated on a common integrated circuit chip. A local bus control unit is further provided that is capable of generating a loading signal and an address strobe signal synchronously with certain bus cycles that are executed on the PCI bus. The local bus control unit allows external peripheral devices that are compatible with the CPU local bus protocols to be connected through the PCI bus. A latch is coupled to the multiplexed address/data (A/D) lines of the PCI bus and includes a set of output lines coupled to the address input lines of the externally connected peripheral device. The external latch is latched by the loading signal. The cycle definition signals of the PCI bus are further latched within the external latch to provide memory/IO and read/write signals to the external peripheral device. The data lines of the peripheral device may be connected directly to the multiplexed address/data lines of the PCI bus.

In accordance with a computer system according to the present invention, CPU local bus-compatible peripheral devices may be advantageously connected to an integrated processor without requiring a full set of external pins that connect directly to the internal CPU local bus. Therefore, the overall cost of the integrated processor may be minimized while maintaining broad compatibility and high performance.

Broadly speaking, the present invention contemplates a computer system comprising a peripheral bus including a plurality of multiplexed address/data lines, a latch having an input port coupled to the plurality of multiplexed address/data lines, and an integrated processor including a CPU core, a local bus, a bus interface unit capable of interfacing data, address, and control signals between the local bus and the peripheral bus, and a local bus control unit coupled to a local bus and capable of generating a loading signal indicative of the presence of a valid address on the peripheral bus. The computer system further comprises a peripheral device having a plurality of addressing lines coupled to an output port of the latch, and a plurality of data lines coupled to the multiplexed address/data lines of the peripheral bus.

The invention further contemplates a method for deriving a CPU local style bus externally from an integrated processor. The integrated processor includes a CPU core, a local bus coupled to the CPU core, and a bus interface unit for interfacing data, address, and control signals between the local bus and an external multiplexed peripheral bus. The method comprises the steps of driving a plurality of multiplexed address/data lines of the peripheral bus with a valid address signal, asserting a loading signal when the peripheral bus is driven with a valid address signal, latching the valid address signal in response to the loading signal, driving the plurality of multiplexed address/data lines with valid data, and providing the valid address signal and the valid data simultaneously to a peripheral device.

BRIEF DESCRIPTION OF THE DRAWINGS

Other objects and advantages of the invention will become apparent upon reading the following detailed description and upon reference to the accompanying drawings in which.

Figure 1:
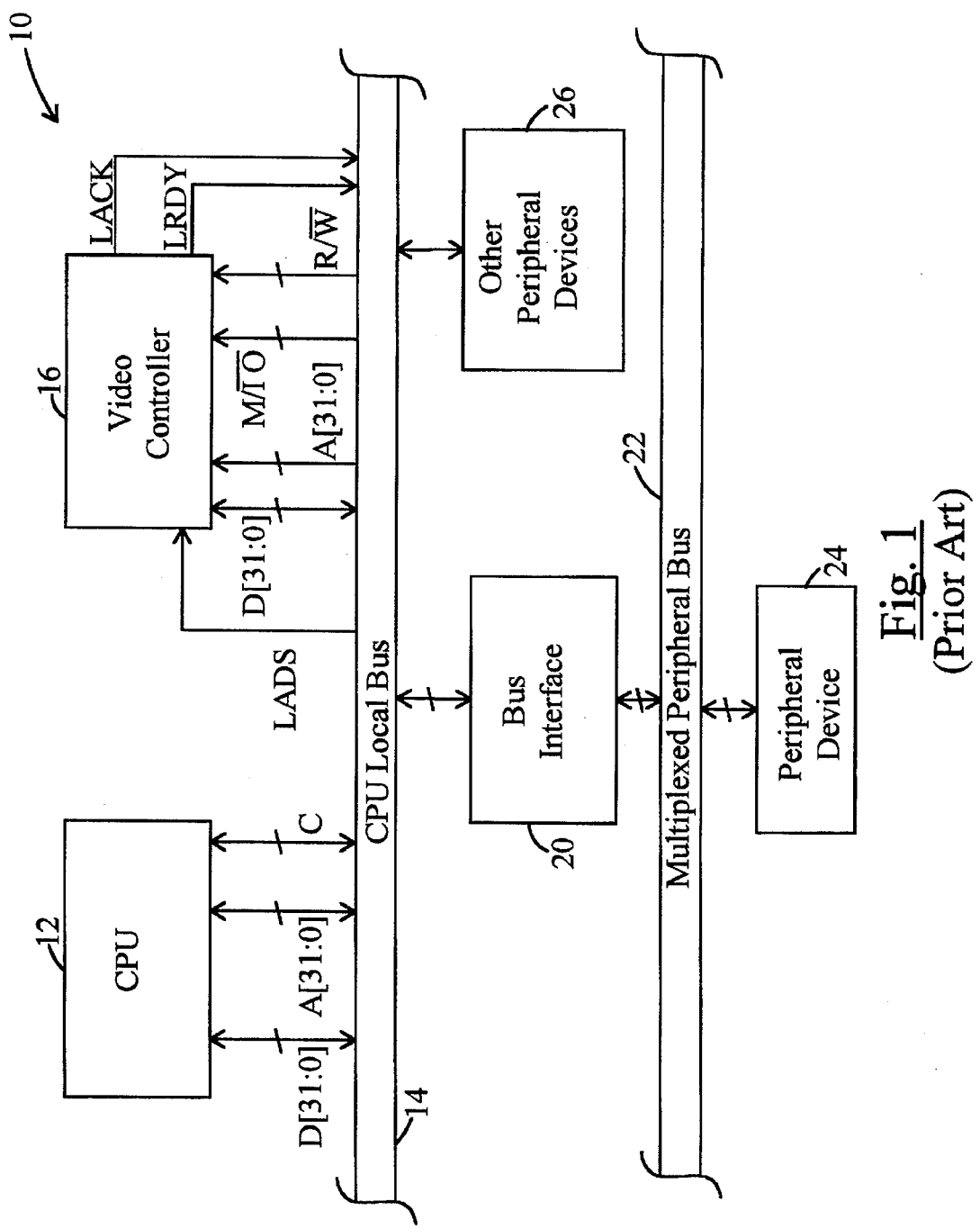
FIG. 1 is a block diagram of a prior art computer system including a multiplexed peripheral bus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
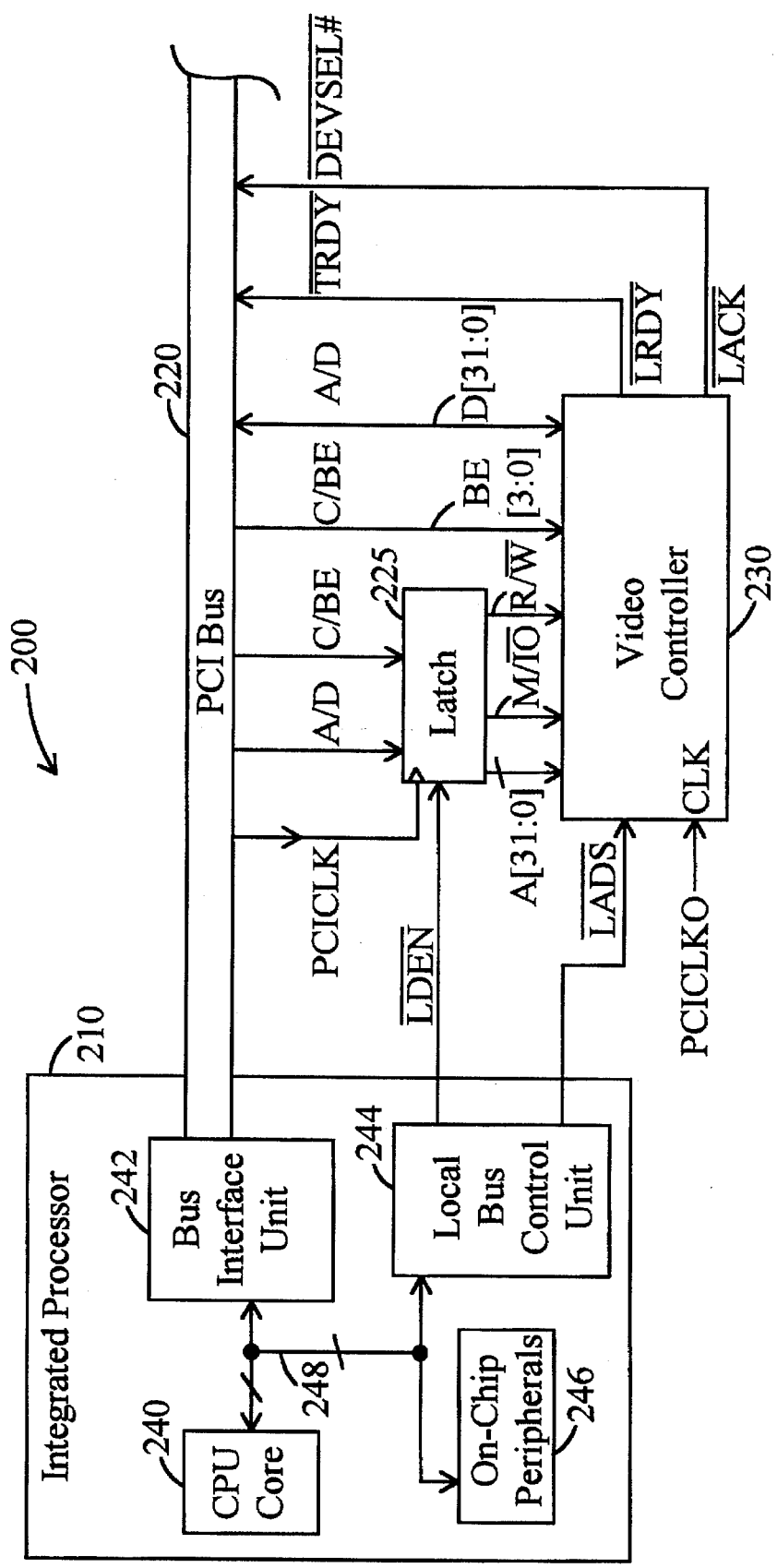
FIG. 2 is a block diagram of a computer system including an integrated processor according to the present invention.

Referring next to FIG. 2, a block diagram is shown of a computer system 200 including an integrated processor 210 according to the present invention. In addition to integrated processor 210, computer system 200 also includes a PCI bus 220, a latch circuit 225, and a peripheral device exemplified specifically within the drawing as a video controller 230. Integrated processor 210 includes a CPU core 240, a bus interface unit 242, a local bus control unit 244, one or more on-chip peripherals designated by block 246, and a local bus 248 that interconnects the internal circuit portions of integrated processor 210. Each of the illustrated components of integrated processor 210 are fabricated on a single integrated circuit and are housed within a common integrated circuit package. In the embodiment shown, CPU core 240 implements a model 80486 microprocessor instruction set. Local bus 248 is similarly a model 80486 style local bus. It is noted, however, that CPU core 240 is also exemplary of other microprocessors, including the model 80286 and model 80386 microprocessors, among others. Bus interface unit 242 provides a standard interface between the CPU local bus 248 and the PCI bus 220. As such, the bus interface unit 242 orchestrates the transfer of data, address, and control signals between local bus 248 and PCI bus 220. As is well known to those of skill in the art, an 80486 local bus includes separate address and data lines, while the PCI bus includes a plurality of multiplexed address/data lines. Details regarding PCI bus 220 are described within the publication entitled "PCI Local Bus Specification"; PCI Special Interest Group; Hillsboro, Oreg. This publication is incorporated herein by reference in its entirety.

The on-chip peripherals block 246 is representative of a variety of peripheral devices that may be incorporated within integrated processor 210. For example, peripherals such as a memory controller, a direct memory access controller, and an interrupt controller could be included as an integral portion of integrated processor 210.

As will explained in further detail below, local bus control unit 244 generates a loading signal LDEN and an address strobe signal LADS that allow an external peripheral device that is compatible with the CPU local bus 248 protocols to be connected to PCI bus 220. The local bus control unit 244 is synchronized with the bus interface unit 242 to ensure proper timing of the loading signal LDEN and the address strobe signal LADS.

Latch 225 is a multi-bit latching circuit which provides selected signals from PCI bus 220 to video controller 230. Latch 225 is enabled by the loading signal LDEN and is clocked by the clock signal PCICLK. Latch 225 may be physically composed of a set of '377 type D latches.

In this embodiment, video controller 230 is a peripheral device that is compatible with and directly connectable to an 80486-style local bus. Video controller 230 controls the display of video information on a monitor (not shown) of computer system 200. Although a video controller 230 is shown connected to the computer system 200 in the embodiment of FIG. 2, it is understood that other local bus compatible peripheral devices may be connected in a similar fashion to the PCI bus 220.

The data, address, and control signals that are coupled between integrated processor 210, PCI bus 220, latch 225, and video controller 230 are next considered. The timing clock for video controller 230 is the PCI clock signal PCICLK0. The multiplexed address/data (A/D) lines of PCI bus 220 are connected to an input port of latch 225. Similarly, the multiplexed cycle definition/byte enable (C/BE) lines of PCI bus 220 are coupled to a second input port of latch 225. The multiplexed address/data (A/D) lines of PCI bus 220 are additionally coupled directly to the data input lines D[31:0] of video controller 230. Similarly, the multiplexed cycle definition/byte (C/BE) lines of the PCI bus 220 are additionally coupled directly to the byte enable lines BE[3:0] of video controller 230. The video controller 230 local bus acknowledge signal LACK is logically connected to the DEVSEL# line of the PCI bus 220. This connection is provided to allow video controller 230 to claim a PCI bus cycle as its own. It is noted that either video controller 230 itself or an external buffer (not shown) must assure that the DEVSEL# line of PCI bus 220 is driven according to the PCI style sustained 3-state (S/T/S) method. The end of cycle ready signal LRDY generated by video controller 230 connects directly to the TRDY line of PCI bus 220. An output port of latch 225 is connected directly to the address input lines A[31:0] of video controller 230. A pair of output lines of latch 225 are further connected to the M/IO and R/W control lines of video controller 230. The loading signal LDEN generated by local bus control unit 244 is coupled to the enable input of latch 225. The clock signal PCICLK is further connected to a clock input of latch 225. Finally, the address strobe signal LADS generated by local bus control unit 244 is coupled to the address strobe input line of video controller 230. This LADS address strobe is generated in accordance with the timing of an 80486 style local bus.

Figure 3:
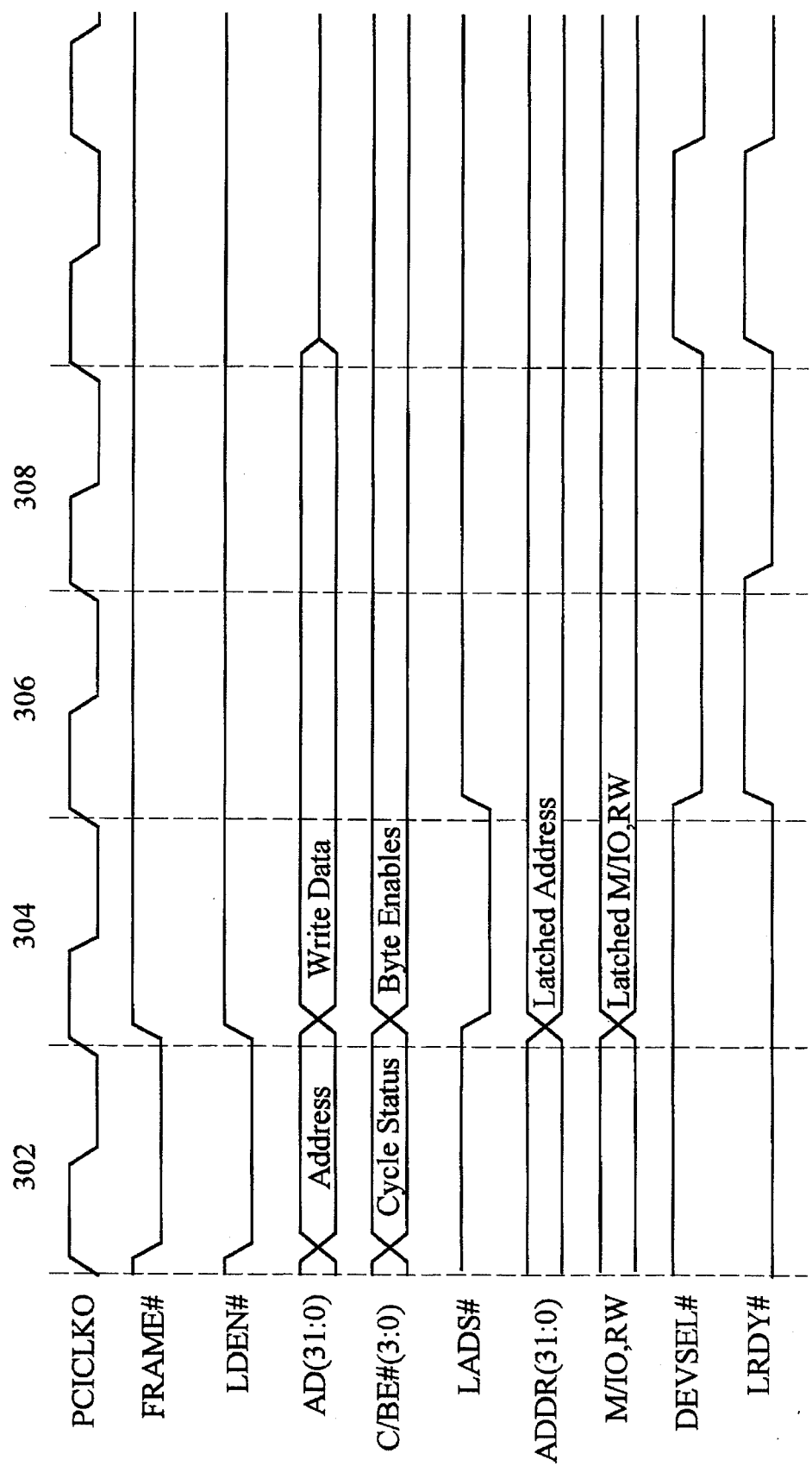
FIG. 3 is a timing diagram that illustrates a write cycle to a peripheral device coupled to a derived CPU local-style bus.

Referring next to FIG. 3 in conjunction with FIG. 2, the operation of the computer system 200 is next explained. FIG. 3 is a timing diagram that illustrates the data, address, and control signals associated with a write cycle to video controller 230. When CPU core 240 initiates a write cycle to video controller 230, the PCI control signal FRAME# is asserted low during a state 302 by bus interface unit 242. At the same time, the multiplexed address/data lines A/D[31:0] of the PCI bus 220 are driven with a valid address, and the cycle definition/byte enable lines C/BE[3:0] of PCI bus 220 are driven with a cycle status opcode to indicate that the present cycle is a write operation. When the FRAME# signal is asserted low, the loading signal LDEN is also asserted by local bus control unit 244. This causes the address and cycle status signals to be stored within latch 225.

During bus state 304, the FRAME# signal is deasserted by bus interface unit 242, and the loading signal LDEN is deasserted by the local bus control unit 244. The write data is driven on the multiplexed address/data lines AD[31:0] of PCI bus 220 by bus interface unit 242, and the byte enable signals are driven on the multiplexed cycle definition/byte enable lines C/BE[3:0] of PCI bus 220. The address strobe signal LADS is further asserted low by the local bus control unit 244. The assertion of the address strobe signal LADS indicates that valid data, address, and control signals are presently being provided to video controller 230. It is noted that the M/IO signal is captured by latch 225 from the C/BE[2] line of PCI bus 220, and that the R/W signal is captured by latch 225 from the C/BE[0] line of PCI bus 220.

During bus state 306, the video controller 230 acknowledges the cycle by asserting the acknowledge signal LACK which accordingly drives the DEVSEL# line of PCI bus 220 low. During bus state 308, video controller 230 writes the data driven on the multiplexed address/data lines of PCI bus 220, and accordingly asserts the end of cycle ready signal LRDY low. This completes the PCI bus cycle.

Figure 4:
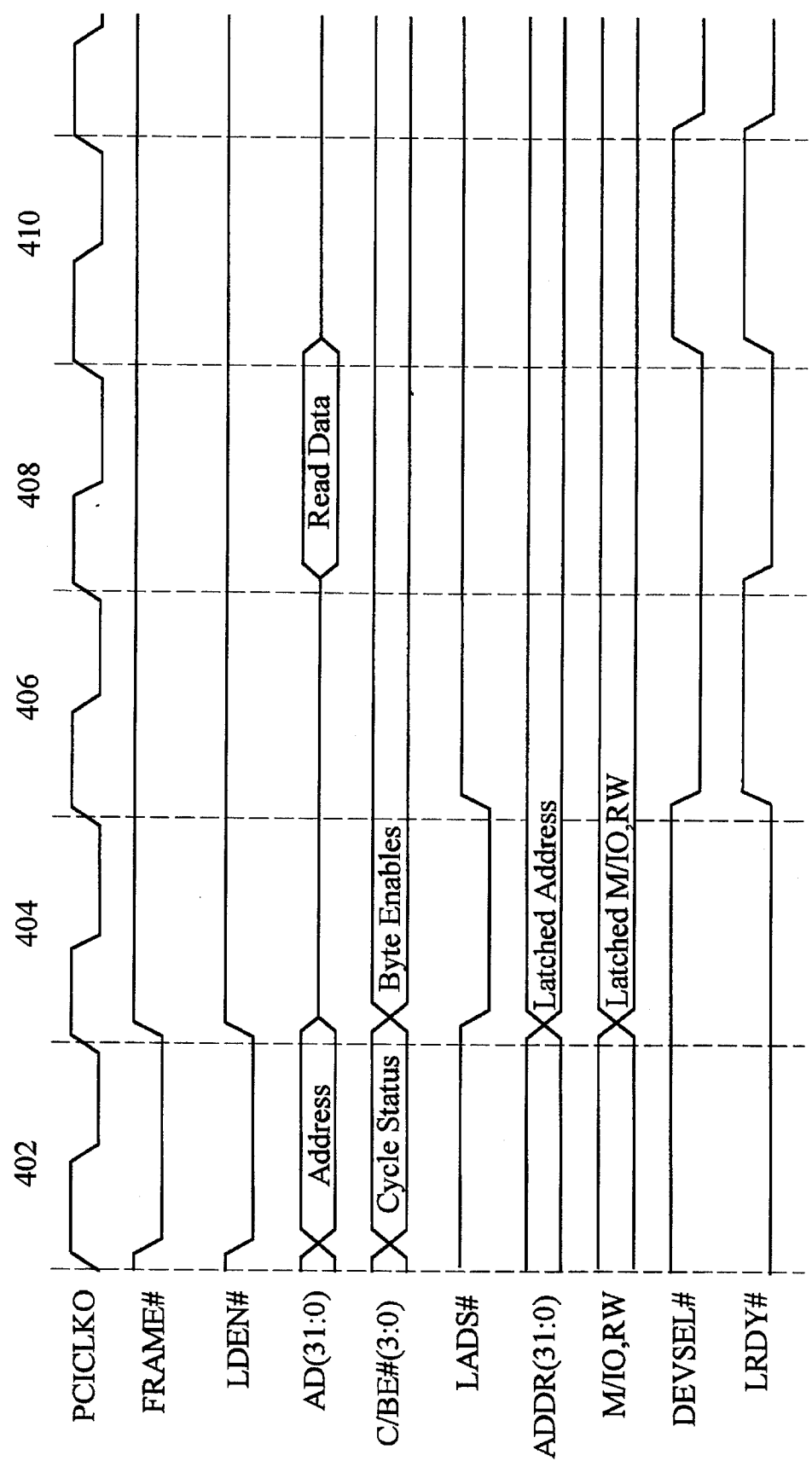
FIG. 4 is a timing diagram that illustrates a read cycle to a peripheral device coupled to a derived CPU local-style bus.

FIG. 4 is a similar timing diagram that illustrates a memory read cycle to video controller 230. During bus state 402, the FRAME# signal is asserted low by bus interface unit 242 and the loading signal LDEN is asserted low by local bus control unit 244. A valid address signal is concurrently driven on the multiplexed address/data lines AD[31:0] of PCI bus 220, and the cycle status signal is driven on the multiplexed C/BE[3:0] lines of PCI bus 220. During this cycle, the cycle status signal indicates a memory read operation.

During bus state 404, the FRAME# signal and loading signal LDEN are deasserted high, and the address strobe signal LADS is asserted low. Accordingly, the valid address signal along with the cycle status signal are provided at the output port A[31:0] and the M/IO and R/W output lines of latch 225. Valid byte enable signals are concurrently driven on the C/BE[3:0] lines of PCI bus 220. During bus state 406, the device acknowledge signal LACK is asserted low by video controller 230 and accordingly the DEVSEL# line of PCI bus 220 is also asserted low. During bus state 408, the read data is driven on the data lines D[31:0] of video controller 230, and is thereby driven upon the multiplexed address/data lines of PCI bus 220. The end of cycle ready signal LRDY is simultaneously asserted low by video controller 230, which causes bus interface unit 242 to latch the read data into integrated processor 210. The PCI bus cycle is thereby completed.

In accordance with the computer system of FIG. 2, a local bus peripheral device may be connected to integrated processor 210 without requiring an external port that connects directly to the internal local bus 248 of integrated processor 210. Accordingly, the number of pins required on the integrated circuit package of integrated processor 210 can be minimized, thereby minimizing cost. Furthermore, while pin count is minimized, broad compatibility of the integrated processor 210 is maintained.

Numerous variations and modifications will become apparent to those skilled in the art once the above disclosure is fully appreciated. For example, devices compatible with the VESA VL-Bus may be connected to a system according to the present invention. It is intended that the following claims be interpreted to embrace all such variations and modifications.

What is claimed is:

1. A computer system comprising:
 a peripheral bus employing a first communications protocol wherein multiplexed address and data signals are conveyed upon a plurality of multiplexed address/data lines;
 a latch having an input port coupled to said plurality of multiplexed address/data lines;
 an integrated processor including:
  a CPU core;
  a local bus coupled to said CPU core, wherein said local bus employs a second communications protocol wherein address signals are conveyed upon a plurality of address lines and data signals are conveyed upon a plurality of data lines;
  a bus interface unit coupled between said peripheral bus and said local bus, and configured to convert data, address, and control signals between compliance with said second communications protocol of said local bus to compliance with said first communications protocol of said peripheral bus; and
  a local bus control unit coupled to said local bus and configured to generate a loading signal indicative of the presence of a valid address on said peripheral bus, wherein said loading signal is provided to a latch enable line of said latch; and
 a peripheral device having a plurality of addressing lines coupled to an output port of said latch, and a plurality of data lines directly coupled to said plurality of multiplexed address/data lines of said peripheral bus wherein said peripheral device is configured to be directly connectable to a bus employing said second communications protocol.

2. The computer system as recited in claim 1 wherein said peripheral bus is a PCI standard configuration bus.

3. The computer system as recited in claim 1 wherein said CPU core implements an 80486 instruction set.

4. The computer system as recited in claim 1 wherein said loading signal is asserted during an address phase of said peripheral bus and wherein said loading signal is deasserted during a data phase of said peripheral bus.

5. The computer system as recited in claim 1 wherein said peripheral device is a video controller.

6. The computer system as recited in claim 1 wherein said latch further includes a plurality of input lines coupled to a multiplexed cycle definition/byte enable lines of said peripheral bus, and includes at least one output line coupled to a read/write line of said peripheral device.

7. The computer system as recited in claim 6 wherein said multiplexed cycle definition/byte enable lines of said peripheral bus are further connected to a plurality of byte enable input lines of said peripheral device.

8. The computer system as recited in claim 1 wherein said local bus control unit is is configured to assert an address strobe signal.

9. The computer system as recited in claim 8 wherein said address strobe signal is provided to an address strobe input line of said peripheral device.

10. The computer system as recited in claim 8 wherein said address strobe signal is asserted when a valid data signal is driven on said peripheral bus.

11. A method for deriving a CPU local style bus externally from an integrated processor, wherein said integrated processor includes a CPU core, a local bus coupled to said CPU core, and a bus interface unit for interfacing data, address, and control signals between said local bus and an external multiplexer peripheral bus, said method comprising the steps of:

driving a plurality of multiplexed address/data lines of said external multiplexed peripheral bus with a valid address signal;

asserting a loading signal when said external multiplexed peripheral bus is driven with said valid address signal;

latching said valid address signal in response to said loading signal;

driving said plurality of multiplexed address/data lines with valid data;

providing said valid address signal and said valid data simultaneously to a peripheral device, said peripheral device being compatible with a protocol of said local bus.

12. The method as recited in claim 11 comprising the further steps of:

driving a cycle definition signal on a set of control lines of said external multiplexed peripheral bus while driving said valid address signal on said plurality of multiplexed address/data lines; and latching said cycle definition signal in response to said loading signal.

13. The method as recited in claim 12 comprising the further steps of driving a byte enable signal on said set of control lines while driving said valid data on said plurality of multiplexed address/data lines.

14. A computer system comprising:

a PCI standard configuration peripheral bus employing a first communications protocol wherein multiplexed address and data signals are conveyed upon a plurality of multiplexed address/data lines;

a latch having an input port coupled to said plurality of multiplexed address/data lines;

an integrated processor including:
      a CPU core that implements an 80486 instruction set;
      a local bus employing a second communications protocol, wherein address signals are converted upon a plurality of address lines and data signals are conveyed upon a plurality of data lines distinct from said address lines coupled to said CPU core;

a bus interface unit coupled between said PCI standard configuration peripheral bus and said local bus, wherein said bus interface unit is configured to interface data and address signals between said address lines and data lines of said local bus and said multiplexed address/data lines of said PCI standard configuration peripheral bus; and a local bus control unit coupled to said local bus and configured to generate a loading signal indicative of the presence of a valid address on said PCI standard configuration peripheral bus, wherein said loading signal is provided to a latch enable input of said latch; and a peripheral device configured to be directly connectable to a bus employing said second communications protocol having a plurality of addressing lines coupled to an output port of said latch, and a plurality of data lines directly coupled to said plurality of multiplexed address/data lines of said PCI standard configuration peripheral bus.

15. The computer system as recited in claim 14 wherein said latch further includes a plurality of input lines coupled to a multiplexed cycle definition/byte enable lines of said peripheral bus, and includes at least one output line coupled to a read/write line of said peripheral device.

16. The computer system as recited in claim 15 wherein said multiplexed cycle definition/byte enable lines of said PCI standard configuration peripheral bus are further connected to a plurality of byte enable input lines of said peripheral device.

17. The computer system as recited in claim 14 wherein said loading signal is asserted during an address phase of said PCI standard configuration peripheral bus and wherein said loading signal is deasserted during a data phase of said peripheral bus.

18. The computer system as recited in claim 17 wherein said local bus control unit is further capable of asserting an address strobe signal.

* * * * *

UNITED STATES PATENT AND TRADEMARK OFFICE
CERTIFICATE OF CORRECTION

PATENT NO. : 5,655,142
DATED : August 5, 1997
INVENTOR(S) : Douglas D. Gephardt, et al.

It is certified that error appears in the above-identified patent and that said Letters Patent is hereby corrected as shown below:

In the Claims:

Claim 8, col. 6, line 60, after the word "is" please delete the word "is".

Signed and Sealed this

Second Day of December, 1997

Attest:

BRUCE LEHMAN

Attesting Officer        Commissioner of Patents and Trademarks